Patented June 23, 1942

2,287,285

UNITED STATES PATENT OFFICE 2,287,285

PREPARATION OF POTASSIUM THIOCARBONATE

Wallis R. Bennett, Midland, Mich., assignor to The Dow Chemical Company, Midland, Mich., a corporation of Michigan No Drawing. Application August 30, 1940, Serial No. 354,832

4 Claims. (Cl. 23—50)

This invention is concerned with an improved method for the preparation of potassium thiocarbonate and a product thereby obtained.

Potassium thiocarbonate is a crystalline compound, soluble in cold water and somewhat unstable on contact with hot water. This compound may be prepared by reacting carbon bisulfide with potassium sulfide. The crude product heretofore obtained has been found valuable as a weed killer. The potential application of the compound as a component of insecticidal, fungicidal, and antiseptic compositions, or as a laboratory reagent, requires that it be employed in water solution. Aqueous compositions heretofore available have contained potassium sulfide in amount equal to 10 per cent or more by weight on the basis of the dissolved thiocarbonate. It is desirable that some means be developed to provide potassium thiocarbonate solutions containing, at most, a very small percentage of potassium sulfide.

Among the objects of this invention are (1) to provide a commercially feasible method for the preparation of potassium thiocarbonate solutions containing very small amounts of potassium sulfide, and (2) to provide a method for the preparation of potassium thiocarbonate from carbon bisulfide and potassium sulfide, wherein the potassium sulfide is substantially completely reacted with the carbon bisulfide. A further object is to provide an aqueous potassium thiocarbonate composition comprising but small amounts of potassium sulfide.

According to the invention, concentrated aqueous solutions of potassium thiocarbonate, containing less than 1.5 per cent by weight of potassium sulfide on the basis of the dissolved potassium thiocarbonate, are prepared by partially reacting potassium sulfide with a molecular excess of carbon bisulfide in the presence of water, thereafter adjusting the pH of the reaction mixture to 8.0 or higher, and continuing the reaction to completion. The excess carbon bisulfide is then separated and the product filtered to remove traces of insoluble heavy metal compounds. The thiocarbonate solution so obtained contains very small amounts of potassium sulfide.

The reaction is carried out at any suitable temperature below the refluxing temperature of the mixture at the pressure employed. Temperatures of from 25°–45° C. are generally satisfactory, and about 35° C. is the preferred reaction temperature when operating at atmospheric pressure. Where the reaction is carried out under super- atmospheric pressure, somewhat higher temperatures are suitable.

Either potassium sulfide hydrate or an aqueous solution of potassium sulfide are employed in the reaction mixture along with a molecular excess of carbon bisulfide with respect to the potassium sulfide. The minimum amount of water required in the reaction zone varies with the amount of potassium sulfide present and, where potassium sulfide hydrate is employed, the degree of hydration of the latter. The minimum operable limit with respect to water is that amount required to form a potassium sulfide solution under the particular reaction conditions maintained. While potassium hydroxide and preferably an aqueous solution thereof is generally used in correcting the pH of the reaction mixture following the partial reaction between the potassium sulfide and carbon bisulfide, other water-soluble alkaline materials such as potassium carbonate may be employed. Such alkalies, however, do not always react with the potassium acid sulfide present in the reaction mixture and may be carried through into the final product as impurities.

The optimum pH to which the mixture is adjusted prior to completion of the reaction depends upon the amount of water employed and upon the concentration of the crude potassium thiocarbonate in the reaction mixture. Where it is desired to obtain as a final product a concentrated solution comprising 50 per cent or higher by weight of potassium thiocarbonate, the pH of the partially reacted mixture is adjusted to at least 8.0 so that the final product will have a pH of between 9.2 and 9.5. The pH may be adjusted to still higher values when more dilute solutions are involved. Any suitable equipment not attacked by the reaction mixture may be employed such as glass-lined, iron, or nickel reactors, and the like.

In carrying out the invention, all of the potassium sulfide may be added to the carbon bisulfide, sufficient water being maintained in the mixture to provide for the presence of an aqueous solution of the sulfide. In an alternate procedure, and particularly where potassium sulfide hydrate is employed, it is preferable to add the potassium sulfide portion-wise to a mixture of carbon bisulfide and the water. In this embodiment of the invention, an amount of water should be maintained in the mixture such that each portion of the hydrate, although it be initially partially insoluble in the water, is reacted with or dispersed in the reaction mixture before further additions are made. When all of the potassium sulfide hydrate has been added and at least partially reacted with carbon bisulfide, or if the carbon bisulfide has partially reacted with an aqueous solution of the potassium sulfide, potassum hydroxide or other suitable alkali is added in amount sufficient to neutralize any potassium acid sulfide in the mixture and to impart to the mixture a pH not lower than 8.0. The reaction is thereafter continued to completion as determined by the analysis of aliquot portions of the mixture. The excess and unreacted portions of carbon bisulfide are then layered off or removed by evaporation. The resulting product consists essentially of a water solution of potassium thiocarbonate, which is filtered, if desired, to remove small amounts of impurities such as insoluble iron salts and the like.

The following example sets forth one embodiment of the invention but is not to be construed as limiting the same.

Example 333 grams of 85 per cent potassium hydroxide was dissolved in 278 grams of water and treated with hydrogen sulfide to obtain a 38 per cent by weight potassium sulfide solution. This solution was mixed with 272 grams of carbon bisulfide in a glass-lined reactor equipped with stirrer and reflux condenser and the mixture warmed to 35° C. and stirred for 24 hours. 7 grams of 85 per cent potassium hydroxide was then added to the partially reacted product and agitation and heating continued for an additional 2 hours. At the end of this time the excess carbon bisulfide present in the mixture was layered off, and the aqueous residue filtered through asbestos. The final filtered solution had a pH of approximately 9.3 as determined with a glass electrode, a specific gravity of 1.394 at 25°/15° C., and contained 51.9 per cent potassium thiocarbonate, 0.6 per cent potassium sulfide, 0.6 per cent potassium thiosulfate, 1.4 per cent potassium carbonate and 45.5 per cent by weight of water. The yield of potassium thiocarbonate was in excess of 90 per cent of theory.

By varying the proportions of reactants and water shown in the foregoing example and/or modifying the reaction conditions with respect to temperature, time, and pH within the limits indicated, aqueous solutions of potassium thiocarbonate may be obtained of varying percentage composition. In operating according to the invention, however, such solutions generally contain less than 1.5 per cent by weight of potassium sulfide or other water—soluble sulfides on the basis of the potassium thiocarbonate produced.

I claim:

1. A method for the preparation of potassium thiocarbonate which comprises the steps of partially reacting potassium sulfide with a molecular excess of carbon bisulfide in the presence of water, thereafter adding alkali in sufficient amount to adjust the pH of the reaction mixture to above 8.0, and continuing the reaction to completion.

2. In the preparation of potassium thiocarbonate from potassium sulfide and a molecular excess of carbon bisulfide in the presence of water, the steps which consist of adjusting the pH of a partially-reacted mixture of the above materials to above 8.0 with potassium hydroxide, and thereafter completing the reaction by warming to a temperature not in excess of the refluxing temperature of the mixture at the pressure employed.

3. A method for the preparation of concentrated potassium thiocarbonate solutions comprising the steps of mixing together the potassium sulfide, a molecular excess of carbon bisulfide, and water sufficient to dissolve the potassium sulfide, heating and stirring the mixture at a temperature not in excess of its reflux temperature at the pressure employed, correcting the pH of the partially reacted mixture to at least 8.0 with potassium hydroxide, warming the mixture to the reacting temperature for an additional period sufficient to complete the reaction, and separating the excess carbon bisulfide.

4. An aqueous solution of potassium thiocarbonate comprising water-soluble sulfides in amount not in excess of 1.5 per cent by weight of dissolved potassium thiocarbonate, as prepared by the method of claim 1.

WALLIS R. BENNETT.